United States Patent [19]

Kordesch

[11] 4,091,178
[45] May 23, 1978

[54] RECHARGEABLE ALKALINE MNO₂-ZINC CELL

[75] Inventor: Karl Victor Kordesch, Lakewood, Ohio

[73] Assignee: Union Carbide Corporation, New York, N.Y.

[21] Appl. No.: 829,925

[22] Filed: Sep. 1, 1977

[51] Int. Cl.² .......................................... H01M 10/24
[52] U.S. Cl. ...................................... 429/60; 429/94; 429/224; 429/230; 429/245
[58] Field of Search .................... 429/60, 94, 164–166, 429/206, 224, 229–231, 245, 246

[56] References Cited

U.S. PATENT DOCUMENTS

| | | | |
|---|---|---|---|
| 3,089,913 | 5/1963 | Garten et al. | 429/60 |
| 3,198,668 | 8/1965 | Schneider | 429/229 X |
| 3,288,642 | 11/1966 | Kordesch | 429/167 X |

Primary Examiner—Anthony Skapars
Attorney, Agent, or Firm—Eugene Lieberstein

[57] ABSTRACT

The rechargeable cell comprises a cathode formed from a compressed mixture of manganese dioxide particles, electrically conductive particles and a binder; an anode separated from the cathode and containing amalgamated metallic zinc particles on an electrically conductive carrier in an amount sufficient to provide a limited anode discharge capacity of about one-third of the cathode capacity; an aqueous alkaline electrolyte; and a charge reserve mass comprising an oxide or hydroxide of zinc in an amount sufficient to provide a charge reserve capacity for said cell equal to at least 50 percent of the anode discharge capacity.

13 Claims, 6 Drawing Figures

RECHARGEABLE ALKALINE MNO₂-ZINC CELL

This invention relates to sealed rechargeable alkaline manganese dioxide-zinc cells.

One of the shortcomings in using $MnO_2$ as the active cathode material in a sealed alkaline secondary cell is its poor rechargeability characteristics once it has been discharged beyond about one-third of its discharge capacity. To overcome this disadvantage the depth of discharge of the alkaline $MnO_2$ cathode may be restricted to a desired level at which it is essentially completely rechargeable. The easiest way of accomplishing this is to limit the anode discharge capacity of the cell to correspond to no more than about one-third of the cathode discharge capacity. Unfortunately a reduction of anode capacity only aggravates another problem normally encountered with secondary cells containing zinc anodes, i.e., they tend to exhibit a gradual decline in discharge capacity with cycling, and reducing the amount of zinc available in the cell only accelerates this situation. Many of the problems associated with recharging a zinc anode contribute to this progressive loss in anode discharge capacity with cycling and relate generally to the amount of zinc available for recharge at each charge cycle, its accessibility and the geometry of the anode. Merely increasing the amount of zinc when the cell is initially assembled reestablishes the problem of too deeply discharging the $MnO_2$ cathode. Additional considerations which must be taken into account in the design of an alkaline $MnO_2$-zinc rechargeable cell relate to the requirement for overcharge and overdischarge protection, which present further constraints on the cell design.

It has been found in accordance with the present invention that the discharge capacity of an alkaline $MnO_2$-zinc rechargeable cell can be rendered substantially more uniform over the useful cycle life of the cell by utilizing in conjunction with a zinc anode of limited discharge capacity, a charge reserve mass adjacent to the zinc anode. This charge reserve mass comprises zinc oxide or zinc hydroxide in an amount sufficient to provide in the cell a charge reserve capacity equal to but not less than about 0.5 times the original anode discharge capacity and up to as much as about two times the original anode discharge capacity. As some zinc is lost on cycling by various mechanisms e.g., diffusion away from the anode area etc., the zinc oxide in the charge reserve mass provides a source of additional zinc. Through the medium of soluble zincate, i.e., zinc species dissolved in the alkaline electrolyte, the additional zinc from the charge reserve mass can be replated as new metallic zinc during charging to essentially duplicate the original anode discharge capacity. It is also important for recharging that this charge reserve mass be present as a coherent, porous, body wetted, but incompletely saturated, with alkaline electrolyte. By having some of its surface, including some of the pores, not blocked by liquid electrolyte, access of oxygen gas to the anode for recombination during overcharging is facilitated.

It has been further observed in accordance with the present invention that the performance of the zinc limited alkaline $MnO_2$ cell can be improved by adding to the anode structure amalgamated copper powder which serves as a matrix on which zinc can be replated during charging and also provides protection against damage caused by either overcharge or overdischarge, e.g., with polarity reversal. By the latter event, when the zinc anode material has been completely discharged, oxidation of the copper powder will occur instead of the reaction which involves the evolution of oxygen gas. The presence of the copper powder also provides for overcharge protection by serving as an intermediate in the gas recombination at the anode. Gas which evolved at the $MnO_2$ electrode after it has been fully charged will react more rapidly with the copper powder in the anode structure than with the zinc powder. The copper oxide in contact with zinc is then reduced to metallic copper and the zinc oxidized to zinc oxide.

Other advantages of the present invention are derived from the construction of the zinc anode which is preferably composed of an electrically conductive carrier such as a perforated sheet or screen coated with amalgamated particles of zinc and copper. In a cylindrical cell the anode should also be arranged concentric with the cathode. This zinc anode construction provides a highly electrically conductive member having a thin layer of the active anode material maintained in very close proximity to the cathode and with excellent electrical and physical contact among all portions of the active anode material (zinc powder). Not only is the more highly efficient electrochemical utilization of the active anode material thereby made possible, but also the internal cell resistance is substantially the same as that encountered with conventional gelled powder zinc anodes containing larger quantities of zinc. Moreover, the anode construction of the present invention does not require the use of large quantities of an organic binder material which may be susceptible to chemical degradation in the cell environment, as is the case with the conventional gelled powder zinc anodes.

The anode member is physically separated from the cathode by a thin layer of a suitable separator material, such as a laminate structure, preferably comprising a nonfibrous regenerated cellulose membrane layer adjacent the metal anode carrier and a superimposed layer of a fibrous nonoxidizable (i.e., stable in the cell environment) synthetic material adjacent the cathode surface.

Accordingly, it is the principal object of the present invention to provide a rechargeable alkaline manganese dioxide-zinc cell of uniform discharge capacity over the cycle life of the cell.

Other objects and related advantages of the invention will become apparent from the following description when read in connection with the accompanying drawings wherein.

The terms "anode" and "cathode" as used throughout refer to those electrodes which serve as the anode (i.e., zinc) and cathode (i.e., $MnO_2$) during discharge of the cell.

Figure 1:
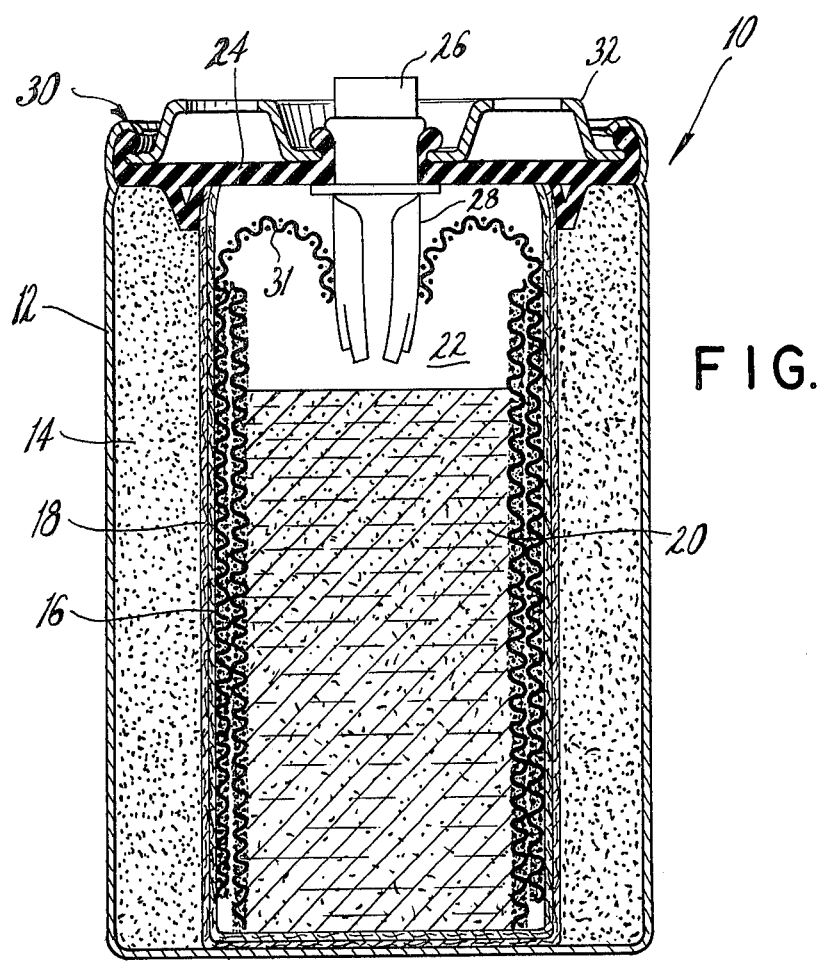
FIG. 1 is an elevational view in vertical section of a cell of the present invention.

FIG. 1 depicts the preferred cell construction of the present invention, exclusive of outer finish. Cell 10 comprises a metal container 12, preferably of steel, a cathode 14 molded into a tubular body against the inner surface of the cylindrical metal container 12, an anode 16, concentrically disposed within the cell 10 and separated from the cathode body 14 by a separator member 18, and a centrally located cavity 22 containing the charge reserve mass 20. Sufficient alkaline electrolyte is provided in the cell to wet the separator 18 and the porous charge reserve mass 20.

The container 12 is sealed with an annular resilient gasket 24 within which is positioned a rivet 26. The rivet 26 secures a split metal member 28 to the top cover 32 through the gasket 24. A compression seal is formed by the application of radial force on that area where the top edge of metal container 12, the upper edge of gasket 24 and the peripheral edge of top cover 32 meet. The edge 30 of the container 12 is then crimped over the periphery of the gasket 24 and metal cover member 32. The rivet 26 represents the negative terminal of the cell 10 when the member 28, serving as the anode current collector, engages the anode 16. This engagement may be formed by making direct physical contact between the member 28 and a bent over portion 31 of the anode 16 as is shown in FIG. 1, or simply by electrically bridging the member 28 to the anode 16 with an auxiliary conductor such as a wire (not shown) which can be welded or soldered in place. Member 28 is a current collector and it should be composed of an electrically conductive material which is preferably electrochemically inactive in the cell 10 such as amalgamated brass or copper screen.

The cathode 14 is composed of a compressed mixture of manganese dioxide particles, electrically conductive particles, which may be in a filamentary form, and a binder. Suitable electrically conductive particles consist of graphite, iron and/or steel wool; the binder is preferably a latex and/or an inorganic cement. The steel container 12 is the positive current collector for the cathode 14. Any conventional process may be employed to compress or mold the cathodic mixture into a tubular solid engaging the inside surface of container 12.

The anode 16 includes a predetermined amount of metallic powdered zinc located in close proximity to the cathode body 14 and dispersed over as large a surface area as practicable. The anode 16 is, accordingly, preferably constructed of a multi-perforated metal carrier, such as an inert metal screen, having a surface of uniformly applied metallic powdered zinc.

The procedure for applying the powdered metallic zinc upon the surface of the metal carrier may simply consist of first forming a paste of powdered metallic zinc with a small amount of a binder such as gelled starch and then brushing or otherwise uniformly applying a controlled amount of the paste to the metal carrier. Alternatively a gel of the predetermined amount of metallic powdered zinc may be formed with a solution of a gelling agent, such as sodium carboxymethyl cellulose, and then coated on the carrier. The carrier material may be chosen from any non-corroding electrically conductive material, such as amalgamated copper, brass, bronze, silver or lead. A zinc carrier may alternatively be used for applications other than those involving very low drains, since the zinc carrier will passivate when the higher surface area zinc powder has been discharged and will not contribute further to the anode discharge capacity. The preferred carrier material is amalgamated copper.

For reasons relating to the overcharge and overdischarge protection of the cell 10, it is preferred to intermix copper particles with the zinc particles before application to the copper screen surface. It is necessary to assure that the copper and zinc particles are amalgamated with mercury, preferably by means of mercuric oxide. Any conventional amalgamating technique may be used. The copper powder added to the anode mix acts as an antipolar mass and can be converted to copper oxide when overdischarge with polarity reversal occurs. Since there is excess $MnO_2$ capacity provided in the cathode, the cell will not evolve gas under forced overdischarge even at high current until the $MnO_2$ is discharged. The copper powder also accelerates the oxygen-zinc reaction on overcharge particularly when a material such as polytetrafluoroethylene, which is not wetted by the aqueous electrolyte, is used as the binder and water-proofing agent in forming the charge reserve mass.

Figure 2:
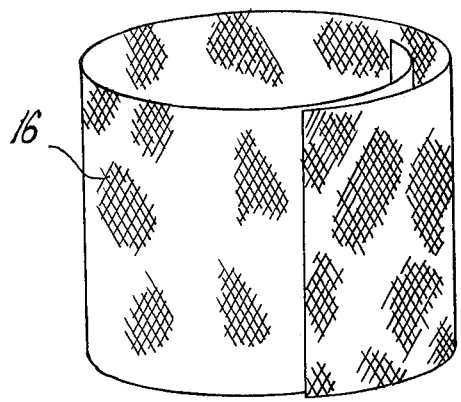
FIG. 2 is a diagrammatic illustration, shown in perspective, of the type of anode used in the cell of FIG. 1.

The preferred anode thus forming utilizes a metal carrier, for example, a metal screen made of 0.018 inch (about 0.045 cm) diameter copper wire and having 24 mesh size (24 meshes/inch) openings. This carrier is coated with an evenly distributed mixture of amalgamated copper and zinc particles in a predetermined proportion with the copper equivalent to about 20 to 40 percent of the zinc anode discharge capacity (based on the conversion of copper to copper oxide), preferably about 30 percent. The coated carrier member may be convoluted as shown in FIG. 2 to form a cylinder with at least a slight overlap, the amount of overlap depending primarily on the length of the coated carrier. The coated carrier is then placed in the cell 10 inside the tubular cathode body 14 and separated therefrom by separator member 18. A portion 31 of the copper screen of the anode 16 is left uncoated and bent so as to provide a surface for physical and electrical contact with the anode current collector member 28.

In accordance with the preferred construction of the cell 10 the separator member 18 should consist of two superimposed or laminated layers of material, one of which should preferably be a nonfibrous regenerated cellulose membrane (e.g. sausage casing material) suitably of about 0.003 inch (about 0.08 cm) in thickness, and the other should be a fibrous non-oxidizable synthetic separator material such as one of the felted fibrous synthetic materials sold under the tradename of "Pellon". The "Pellon" layer should be placed against the inner surface of the cathode in the cell 10.

The central cavity or reservoir 22 of the cell 10 should be substantially filled with a charge reserve mass 20 consisting essentially of; an oxide or hydroxide of zinc, preferably zinc oxide, water and a binder. The charge reserve mass 20 may be conveniently assembled in the cell by extruding into the central cavity a thick paste made by mixing the zinc oxide or hydroxide and a binder together with sufficient water to obtain the desired viscosity. Aqueous alkaline electrolyte, suitably at least 9 N potassium or sodium hydroxide, may be added to the cell after insertion of the charge reserve mass paste. Contact with the alkaline electrolyte causes some swelling and further hardening of the charge reserve mass so that its mechanical integrity is enhanced. Alternatively, the aqueous alkaline electrolyte may be mixed with the zinc oxide and binder prior to insertion of the charge reserve mass into the cell. In this instance, the charge reserve mass will appear drier and considerably more viscous prior to insertion in the cell. Whether the electrolyte is added to the cell with the charge reserve mass components or after assembly and insertion of the preformed charge reserve mass, aqueous alkaline electrolyte should be introduced into the cell sometime during assembly in an amount sufficient to wet the separator member 18 and contact cathode body 14 and to at least partially wet the charge reserve mass 20. As was emphasized earlier, the finished state of the charge reserve mass in the fully assembled cell must be such that it is a porous, coherent body partially wetted but incompletely saturated by the alkaline electrolyte (i.e., semi-dry) so that at least some portions of its surface, including some of the pores, are not blocked by the liquid electrolyte thereby permitting rapid access of oxygen gas to the zinc anode for recombination during overcharging of the cell.

In forming the charge reserve mass 20, a binder is needed to maintain mechanical integrity of the mass and uniform distribution of its components. The binder should be electrolyte-repellent in some degree as well as stable in the cell environment and may be a material such as natural or synthetic polymer. Suitable binder materials include natural and synthetic rubbers, polysulfone, acrylic polymers, such as polymethylmethacrylate, epoxy resins, and polystyrene or a fluorocarbon polymer such as polytetrafluoroethylene. The preferred binder is polytetrafluoroethylene which is commercially sold under the trademark "Teflon." This material is available in the form of an aqueous emulsion which is a convenient medium to use in making the charge reserve mass. The binder should constitute at least about 15% by weight of the zinc oxide in the charge reserve mass 20, but preferably not more than about 40 based on the dry weight of both components.

The minimum amount of zinc oxide in the charge reserve mass 20 is important to the present invention if substantial uniformity in discharge capacity on cycling is to be assured over the useful life of cell 10. This amount of zinc oxide should be sufficient to provide a charge reserve capacity for the cell 10 equal to about 50 percent or more of the predetermined zinc anode discharge capacity. For purposes of the present invention this minimum requirement for the amount of zinc oxide in charge reserve mass 20 shall be determined by simply assuming that all of the zinc oxide in the charge reserve mass is electrochemically reduced to metallic zinc and that all of the so-reduced metallic zinc is available to provide additional ampere-hour (AH) capacity for the cell. Thus, for example, if the anode has 10 grams of metallic zinc available for discharge then the minimum amount of zinc oxide needed in the charge reserve mass 20 would be about 6 grams. This is determined very simply in the following manner:

10 gm. Zn × 0.5 = 5 gm.

5 gm. × 81/65 (mol. wt. ratio of ZnO/Zn) = 6 gm ZnO needed

In other words, the weight of zinc oxide in the charge reserve mass should be about or over 60% of the weight of metallic zinc in the anode exclusive of the conductive carrier in order to satisfy the minimum charge reserve capacity requirement for the cell.

It is actually preferred to operate with a zinc oxide charge reserve capacity within a range of between about 50 to 200 percent of the anode discharge capacity with about 100 to 150 percent of the anode discharge capacity being optimum. The upper limit depends on the internal volume available in the cell. The zinc oxide requirement for satisfactory cell performance in accordance with the present invention will be further discussed hereafter in connection with the performance and comparative capacity curves shown in FIGS. 3, 4 and 5 respectively.

Figure 3:
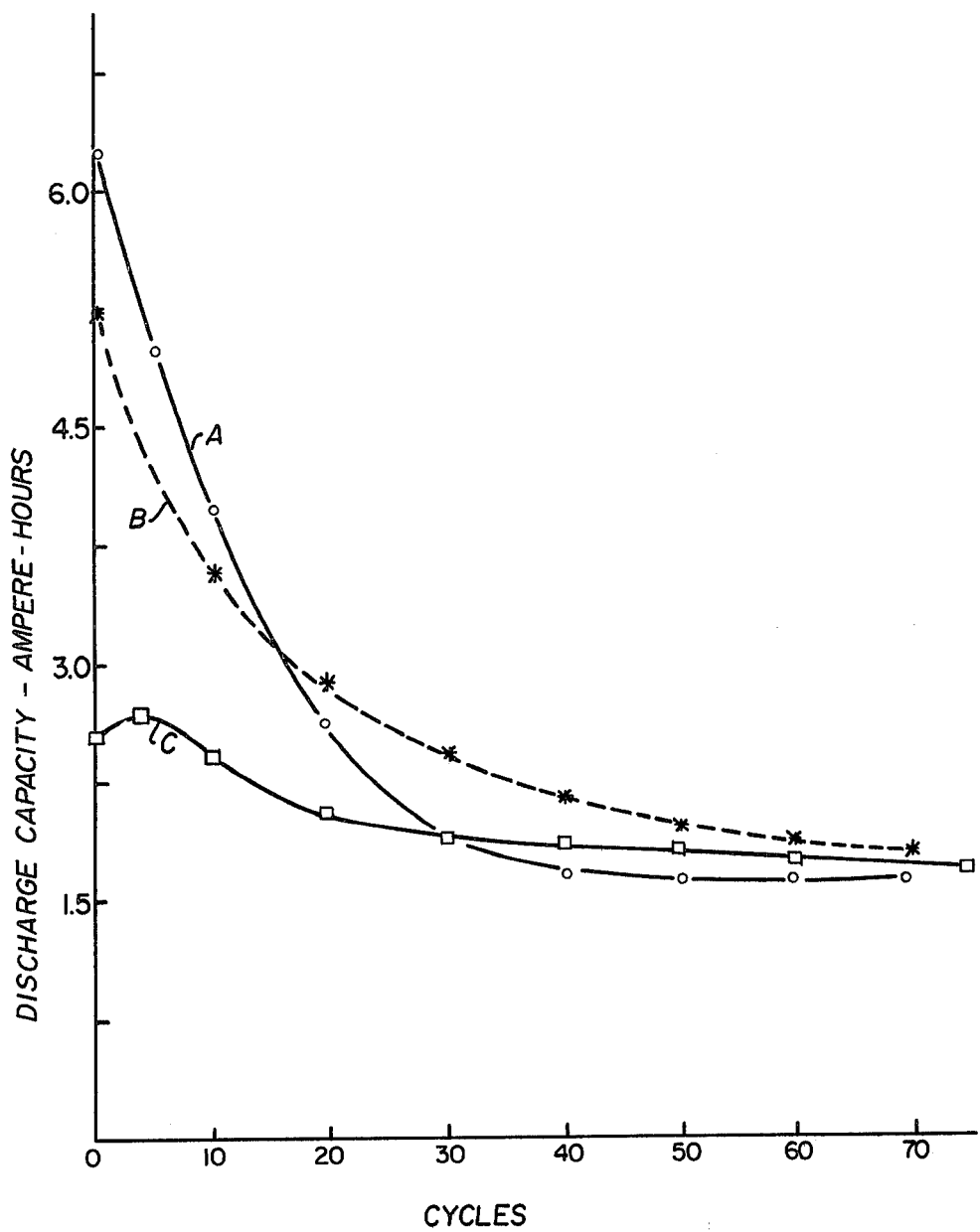
FIG. 3 is a graph comparing the performance of alternate zinc-limited alkaline manganese dioxide constructions, including the cell of the present invention, in terms of the cell discharge capacity over the cycle life of the cell.
Figure 4:
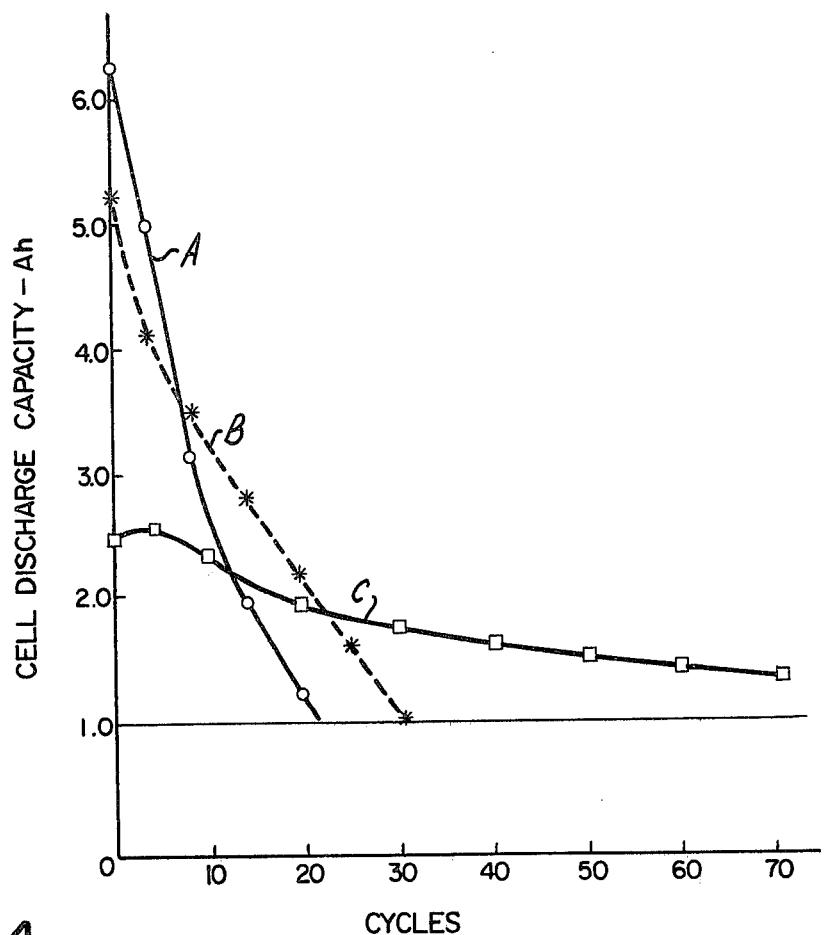
FIG. 4 is a graph similar to FIG. 3 with each discharge limited to a 0.8 volt cutoff respectively.

The cell of the present invention is compared in FIGS. 3 and 4 with several other alkaline $MnO_2$ secondary cells with respect to the cell discharge capacity delivered over the cycle life of the cell. The construction of each of the cells differs with regard to the zinc anode; its geometry, its disposition in the cell and the amount of zinc present. All of the cells used in making this comparison were the standard cylindrical "D" size. The cathode in each cell was of a molded tubular construction composed of a compressed mixture of $MnO_2$ particles, a binder and electrically conductive particles as heretofore taught in the specification. A separator member was cylindrically disposed adjacent to the cathode in all of the compared cells. The zinc anode, in the cell identified by curve A, was formed in a conventional manner by preparing an aqueous alkaline mixture containing approximately 10 to 12 grams of zinc particles (instead of the usual 20 to 22 grams) mixed with a suitable alkaline electrolyte, viz., 9N KOH, water and a binder such as acetylcellulose. The anode mixture thus prepared was located in the central cavity formed in the center of the cell together with a long pronged central collector. Although, the amount of metallic zinc in the anode formulation of the cell was somewhat limited, it was not sufficiently limited to prevent discharge of over 30 percent of the cathode capacity during the earlier cycles. The cathode capacity was 11 ampere hours and that of the anode about 7 ampere hours.

The anode construction in the cell identified by curve B differed from the curve A anode construction in that it consisted of only eight grams of zinc powder applied upon an amalgamated copper screen carrier disposed adjacent to the separator. An aqueous alkaline gel formulation was prepared without zinc powder and used to fill the remaining central cavity in the center of the cell.

Curve C is representative of the cell of the present invention containing a porous, coherent charge reserve mass in the central cavity of the cell which consisted of 10 grams of zinc oxide in combination with KOH, water and "Teflon" binder as taught heretofore. In this cell, only six grams of metallic zinc was applied to the amalgamated copper screen carrier to form the anode body. Copper powder was included with the zinc powder in the amount of 1.5 grams which is equivalent to about 25% of the zinc anode discharge capacity.

FIG. 3 shows capacity maintenance of cells discharged to a 0.3 volt cutoff for 70 cycles through a 2.25 ohm resistor, i.e., an average current of 0.4 ampere. At the end of each discharge, the cells were recharged to a 1.85 volt level. The cells were discharged down to the 0.3 volt cutoff level in order to observe the behavior of the zinc anode on discharge essentially ignoring the effect of cathode deterioration which will occur in cells discharged to this low cutoff voltage. In the cells illustrated by Curves A and B, the capacity was initially high because of the greater amounts of zinc available in the cells but dropped rapidly thereafter. Curves A and B eventually stabilized at about the same capacity level as Curve C, which except for a slight initial rise in capacity, remained at essentially the same capacity level until the test was terminated.

The advantages of the invention can be more readily appreciated on viewing FIG. 4 in conjunction with FIG. 3. FIG. 4 similarly shows capacity maintenance of cells discharged to a 0.8 volt cutoff through a 2.25 ohm resistor. The cells were recharged after discharge on each cycle to the same 1.85 volt level. The enhanced uniformity of the discharge capacity delivered on cycling by the cell of the present invention is illustrated by Curve C. In the cells illustrated by Curves A and B, the cell capacity utilizing the greater amounts of available zinc anode material is high during the early discharge cycles but drops rapidly due to cathode voltage decline. In contrast, the capacity of cell C is lower than that of A and B during the initial cycles because less zinc is available for initial discharge cycles. Yet the high content of zinc oxide reserve available in cell C permits substantial attainment of zincate equilibrium between charge and discharge and aids in maintaining a more uniform discharge capacity over the cycle life of the cell. The short cycle life of cells A and B is clearly indicated in FIG. 4 where the practical commercial cut-off voltage of 0.8 volts is used.

Because of the requirement for so large an amount of zinc oxide it is necessary to locate the zinc oxide body out of the current path between the anode and the cathode. Such a large amount of zinc oxide should not, for instance, be mixed with the zinc particles because of the high anode resistance and poor discharge efficiency (lower zinc utilization) that this would otherwise produce.

Figure 5:
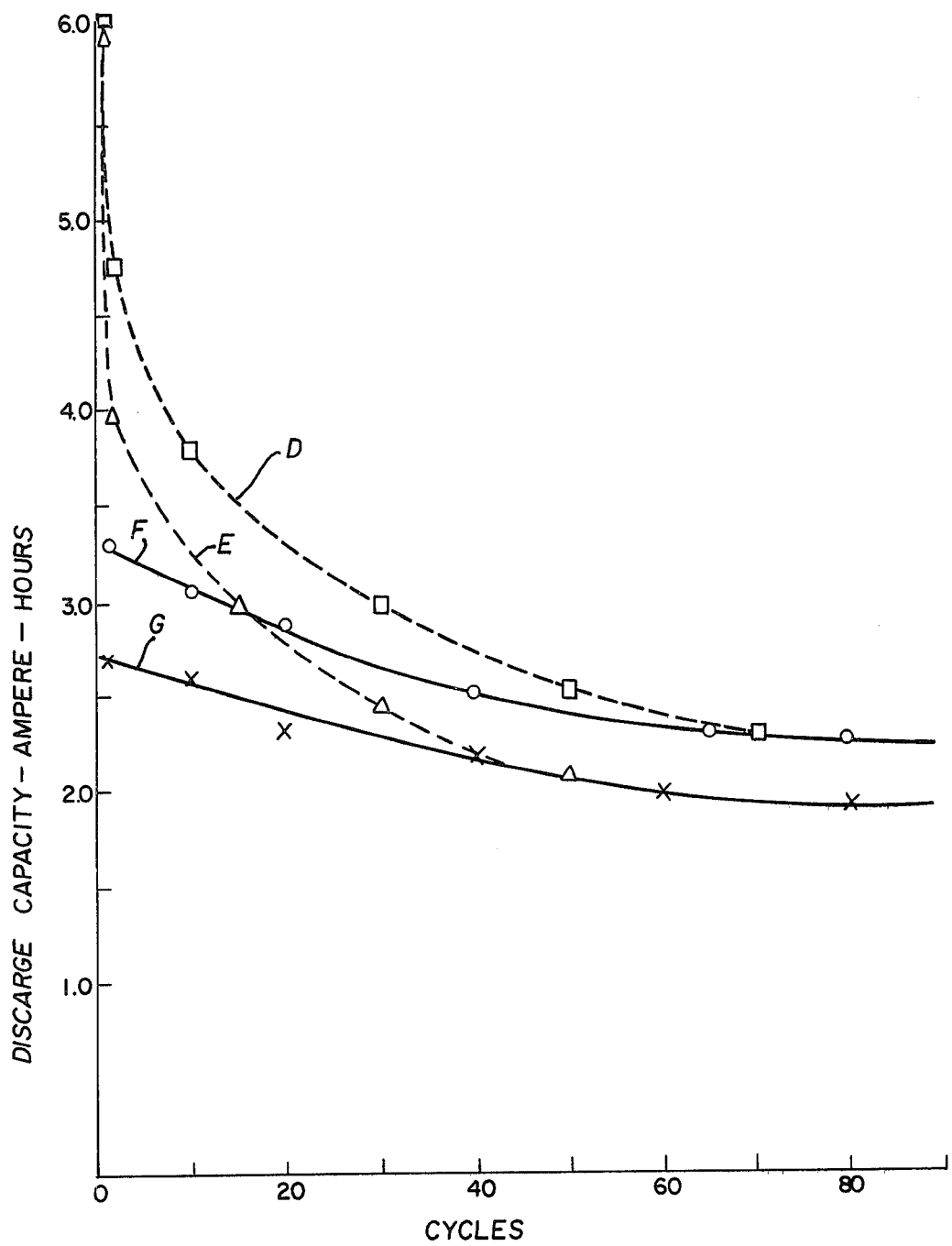
FIG. 5 is another graph illustrating the performance of the cell of the present invention with different amounts of zinc oxide in the charge reserve mass.

FIG. 5 illustrates how the discharge capacity over the cell life is affected by different amounts of zinc oxide. The curves also show that the indicated rates of discharge here had less influence over the discharge capacity than does the amount of zinc oxide reserve. The curves represent the performance of "D" size alkaline $MnO_2$-zinc cells (as constructed in accordance with FIG. 1) using 8 and 6 grams of metallic zinc powder in preparing the anodes with corresponding zinc oxide charge reserve masses of one gram and five grams of zinc oxide respectivly. The dotted line curves D and E represent the cell containing only one gram of zinc oxide in the charge reserve mass. The cycling performance of the cell is shown on continuous discharge at 0.3 amperes (curve D) and 0.5 amperes (curve (E) respectively to a cutoff voltage of 0.3 volt. The two solid line curves F and G show cycling on continuous discharge at 0.3 amperes (curve F) and 0.5 amperes (curve G) respectively for a cell with only 6 grams of zinc but with the amount of zinc oxide raised to 5 grams. The initial discharge capacity of the cells having the greater zinc oxide content and a lower zinc metal content is substantially less than the initial discharge capacity of the cells having only a minor amount of zinc oxide and a greater amount of zinc metal. The discharge capacity of the cells having the larger reserve mass of zinc oxide showed a substantially flatter capacity curve over a greater cycle life as substantiated in FIG. 4. As was the case with FIG. 3, the low cutoff voltage was selected in the FIG. 5 tests in order to observe the behavior of the zinc anode while essentially ignoring the deterioration of the cathode.

Figure 6:
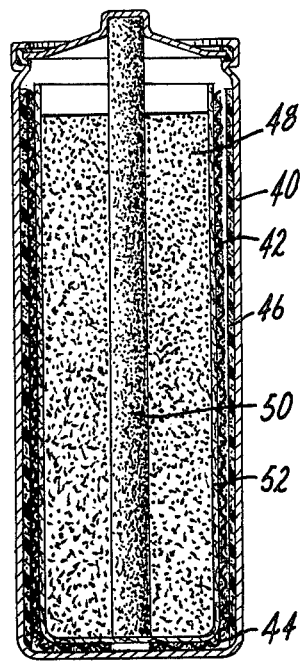
FIG. 6 is an alternative cylindrical cell construction in which the anode and charge reserve mass are shown surrounding the cathode.

Although the invention has been described with respect to the preferred embodiment, in which the molded tubular cathode is shown concentrically surrounding the anode and charge reserve mass, it should be understood that the invention is equally applicable to a cylindrical cell configuration in which the cathode is surrounded by the anode and the charge reserve mass as indicated for example in FIG. 6.

In the cell configuration of FIG. 6 the metal container 40 is preferably of copper plated steel and serves as the negative terminal. The anode 42 is formed using a metal carrier screen as shown in FIG. 2 with a surface coating of amalgamated particles of zinc and copper as described hereinbefore with reference to anode 16. The anode 42 has a bent over end 44 in contact with the bottom of the container 40. The charge reserve mass for the anode 42, comprising zinc oxide or hydroxide in the critical range taught heretofore, is applied in a paste form to an open plastic framework 46 which provides structural support and facilitates centering the mass in an annulus between the anode 42 and the container 40. The cathode 48 is in the form of a bobbin composed of a compressed mixture of manganese dioxide particles, electrically conductive particles and a binder pressed around a current collector rod 50. The cathode 48 and collector rod 50 are centrally located and separated from the anode 42 by a separator member 52 which may be similar to the separator member 18 in FIG. 1.

Cell configurations other than cylindrical are also within the scope of the present invention such as, for example, a miniature "button cell". The essential characteristic is the use of a separate charge reserve mass for the anode in the critically defined range.

What is claimed is:

1. A rechargeable alkaline $MnO_2$-zinc cell comprising:
    a cathode composed of a compressed mixture of manganese dioxide particles, electrically conductive particles and a binder;
    an anode containing amalgamated metallic zinc particles on an electrically conductive carrier, said zinc particles having a predetermined discharge capacity of no greater than about one-third of the discharge capacity of said cathode;
    a separator member for separating said cathode from said anode;
    an aqueous alkaline electrolyte; and
    a charge reserve mass in contact with said anode and comprising an oxide or hydroxide of zinc in an amount sufficient to provide a charge reserve capacity for said cell equal to at least about 50 percent of said predetermined anode discharge capacity.

2. A rechargeable cell as defined in claim 1 wherein said oxide or hydroxide of zinc is zinc oxide in an amount equal to from between about 50 to 200 percent of said predetermined anode discharge capacity.

3. A rechargeable cell as defined in claim 2 wherein said zinc oxide is present in an amount equal to from between about 100–150 percent of said predetermined anode discharge capacity.

4. A rechargeable cell as defined in claim 2 wherein said anode comprises a perforated metal carrier formed from a non-corroding electrically conductive material selected from the group consisting of amalgamated copper, brass, bronze, silver, lead, or zinc and a coating applied to said metal carrier which includes said amalgamated zinc particles.

5. A rechargeable cell as defined in claim 4 wherein said coating further includes amalgamated particles of copper intermixed with said amalgamated zinc particles.

6. A rechargeable cell as defined in claim 5 wherein said metal carrier is composed of amalgamated copper.

7. A rechargeable cell as defined in claim 6 wherein the amount of said coated amalgamated copper particles lies in a range of between about 20–40% of said anode discharge capacity.

8. A rechargeable cell as defined in claim 6 wherein said cell is of a cylindrical geometry and wherein said anode and cathode are arranged concentric to one another.

9. A rechargeable cell as defined in claim 8 wherein said metal carrier has a convoluted geometry with at least a slight overlap.

10. A rechargeable cell as defined in claim 9 wherein said cathode is of a tubular configuration surrounding said anode and wherein said charge reserve mass is located substantially in the center of said cell.

11. A rechargeable cell as defined in claim 9 wherein said anode is cylindrically disposed about said cathode and wherein said charge reserve mass forms an annulus around said anode.

12. A rechargeable cell as defined in claim 10 wherein the separator member of said cell is composed of a non-fibrous regenerated cellulose membrane located contiguous to said metal anode carrier and a superimposed fibrous non-oxidizable separator layer contiguous to said cathode.

13. A rechargeable cell as defined in claim 12 wherein said charge reserve mass further comprises a binder material selected from the group consisting of natural and synthetic rubbers, polysulfone, acrylic polymers, epoxy resins, polystyrene and polytetrafluoroethylene.

* * * * *